(12) United States Patent
Yano

(10) Patent No.: US 6,246,639 B1
(45) Date of Patent: Jun. 12, 2001

(54) MAGNETIC HEAD HOLDING APPARATUS FOR RECORDING A MAGNETO-OPTICAL DISC

(75) Inventor: Hajime Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 07/980,489

(22) Filed: Nov. 23, 1992

(30) Foreign Application Priority Data

Nov. 28, 1991 (JP) .................................................. 3-339751

(51) Int. Cl.⁷ ............................ G11B 11/00; G11B 17/04
(52) U.S. Cl. ........................... 369/13; 369/77.2; 369/75.2
(58) Field of Search ................................. 369/13, 44.15, 369/44.18, 44.21, 77.2, 75.1, 75.2, 77.1, 270, 271; 360/114, 59, 99.06, 99.02, 96.5, 99.07

(56) References Cited

U.S. PATENT DOCUMENTS

| | | | |
|---|---|---|---|
| 4,879,616 | * 11/1989 | Ando | 360/99.06 |
| 5,168,484 | * 12/1992 | Wachi et al. | 369/13 |
| 5,197,050 | * 3/1993 | Murakami et al. | 369/13 |
| 5,224,079 | * 6/1993 | Inoue | 369/13 |
| 5,309,421 | * 5/1994 | Fujisawa | 369/77.1 |

FOREIGN PATENT DOCUMENTS

| | | |
|---|---|---|
| 0 133 594 A3 | 2/1985 | (EP) . |
| 0 404 589 A2 | 12/1990 | (EP) . |
| 0 439 286 A3 | 7/1991 | (EP) . |
| 0 455 158 A2 | 11/1991 | (EP) . |
| 0 524 839 A2 | 1/1993 | (EP) . |

* cited by examiner

Primary Examiner—Ali Neyzari

(57) ABSTRACT

A magneto-optical disc recording and/or reproducing apparatus for writing in and/or reading out an information signal from a rewritable magneto-optical disc is provided. In particular, a lifting mechanism for lifting a supporting arm that supports the magnetic head is provided where a lifting member is interposed between an arm member supporting a magnetic head and a magneto-optical disc. The lifting member is supported by a chassis in a manner in which it is rotatable in a direction in which it allows the magnetic head to come into contact with or near to a magneto-optical disc surface and in an opposite direction away from the magneto-optical disc.

5 Claims, 4 Drawing Sheets

MAGNETIC HEAD HOLDING APPARATUS FOR RECORDING A MAGNETO-OPTICAL DISC

BACKGROUND OF THE INVENTION

1. Field of the Invention

The present invention generally relates to magneto-optical disc recording and/or reproducing apparatus for writing in and/or reading out an information signal from a rewritable magneto-optical disc and, more particularly, is directed to a lifting mechanism for lifting a supporting arm that supports thereon a magnetic head which generates an external magnetic field to a magneto-optical disc.

2. Description of the Related Art

It is customary that a magnetic head for a rewritable magneto-optical disc (hereinafter simply referred to as an MO disc) is located as close as possible to the MO disc in order to generate a sufficient external magnetic field to the surface of the MO disc when an information signal is recorded on the MO disc. Therefore, when the MO disc is loaded onto and/or ejected from the magneto-optical disc recording and/or reproducing apparatus, the magnetic head must be isolated from the MO disc so that the MO disc is prevented from coming in contact with the magnetic head. A mechanism for lifting an arm that supports the magnetic head is therefore used to isolate the magnetic head from the MO disc. The conventional arm lifting mechanism is generally composed of an arm supporting mechanism and an actuator such as a plunger or the like secured to one portion of the arm supporting mechanism.

Since, however, the arm supporting mechanism has little space to spare, the above arm lifting mechanism cannot be incorporated into the small space substantially from a technical standpoint. Further, the arm supporting mechanism has mounted thereon a relatively heavy actuator because it is coupled to the moving mechanism of an optical pickup device. Therefore, the load is increased and a drive motor suffers from the increased load so that the conventional arm supporting mechanism is not suitable for reducing an amount of electric power. To solve the above problem, it is proposed that the actuator is supported to a stationary member such as a chassis or the like that is not operated in a ganged relation with the arm supporting mechanism. However, an arm itself is operated in a ganged relation with the optical pickup device and the arm is moved in the inner and outer diametrical directions of the MO disc during an information signal is written in and/or read out from the MO disc. There is then the problem such that an undesirable load is applied to the arm by the actuator.

OBJECTS AND SUMMARY OF THE INVENTION

Therefore, it is an object of the present invention to provide an improved magnetic head supporting arm lifting mechanism in which the aforesaid shortcomings and disadvantages of the prior art can be eliminated.

It is an object of the present invention to provide a magnetic head supporting arm lifting mechanism in which an arm having mounted thereon a magnetic head can be smoothly lifted without a load applied thereto by an arm lifting mechanism.

It is another object of the present invention to provide a magnetic head supporting arm lifting mechanism that can be simplified in arrangement.

It is still another object of the present invention to provide a magnetic head supporting arm lifting mechanism in which an arm can be lifted in a small space, thereby making a magneto-optical disc recording and/or reproducing apparatus compact in size.

According to an aspect of the present invention, there is provided a magnetic head supporting mechanism for a magneto-optical disc recording and/or reproducing apparatus which includes an optical pickup device being made movable in the radial direction of a magneto-optical disc and radiating a light beam on tracks formed on the magneto-optical disc, and a magnetic head disposed on a head supporting mechanism movable in synchronism with the optical pickup device in an opposing relation to the optical pickup device across the magneto-optical disc so that the magnetic head generates an external magnetic field on the tracks of the magneto-optical disc. This magnetic head supporting mechanism comprises an arm member having on one end thereof provided the magnetic head and being rotatably supported by a movable member that is moved in synchronism with the optical pickup device in the direction in which the magnetic head comes in contact with or away from a surface of the magneto-optical disc, a lifting member being interposed between the arm member and the magneto-optical disc in substantially parallel to the moving direction of the magneto-optical disc and being supported at least on one end thereof to a chassis so that the lifting member becomes rotatable in the direction in which it comes in contact with or away from the surface of the magneto-optical disc surface, and a driving device for rotating the lifting member so that the arm member is lifted in the direction in which the arm member comes away from the surface of the magneto-optical disc.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, wherein.

DETAILED DESCRIPTION OF THE PREFERRED EMBODIMENTS

The present invention will now be described in detail with reference to the drawings.

Figure 1:
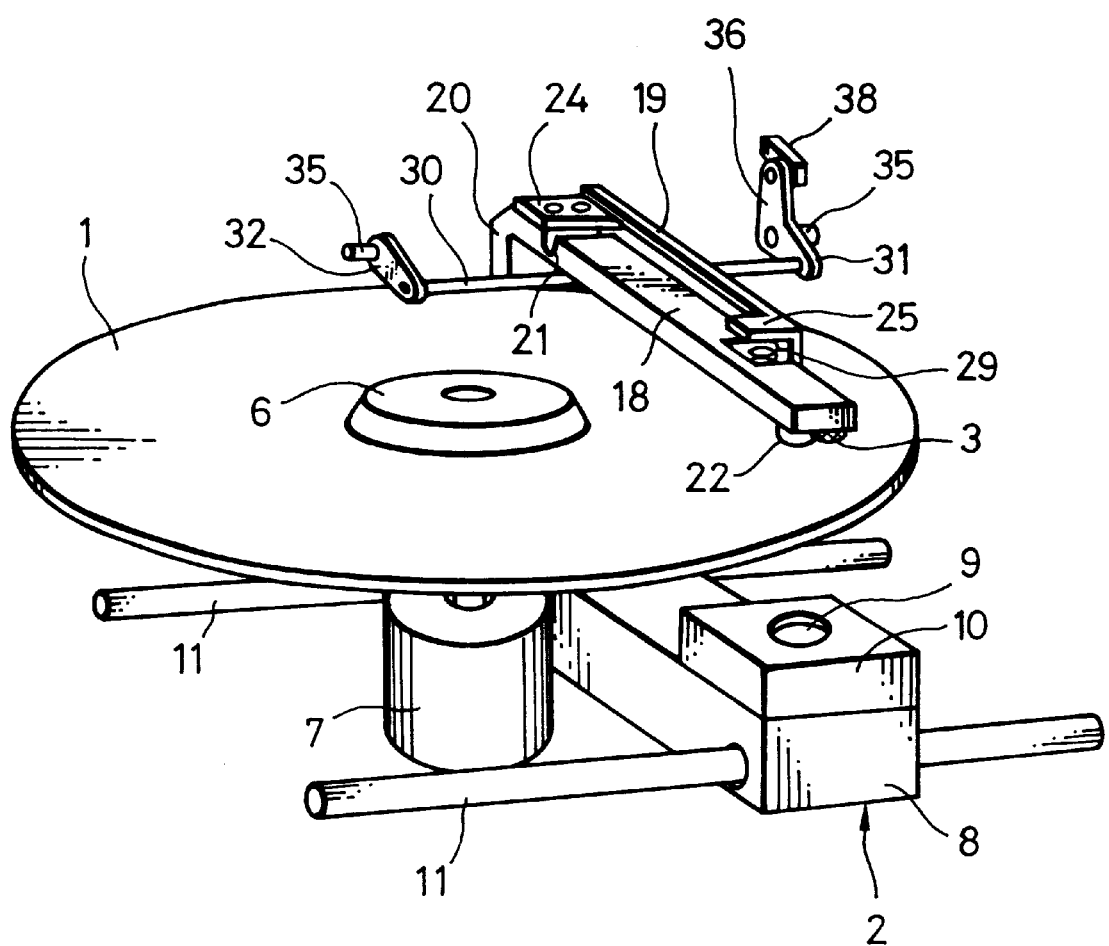
FIG. 1 is a perspective view of a main portion of a first embodiment of a magneto-optical disc recording and/or reproducing apparatus having a lifting mechanism according to the present invention.
Figure 2:
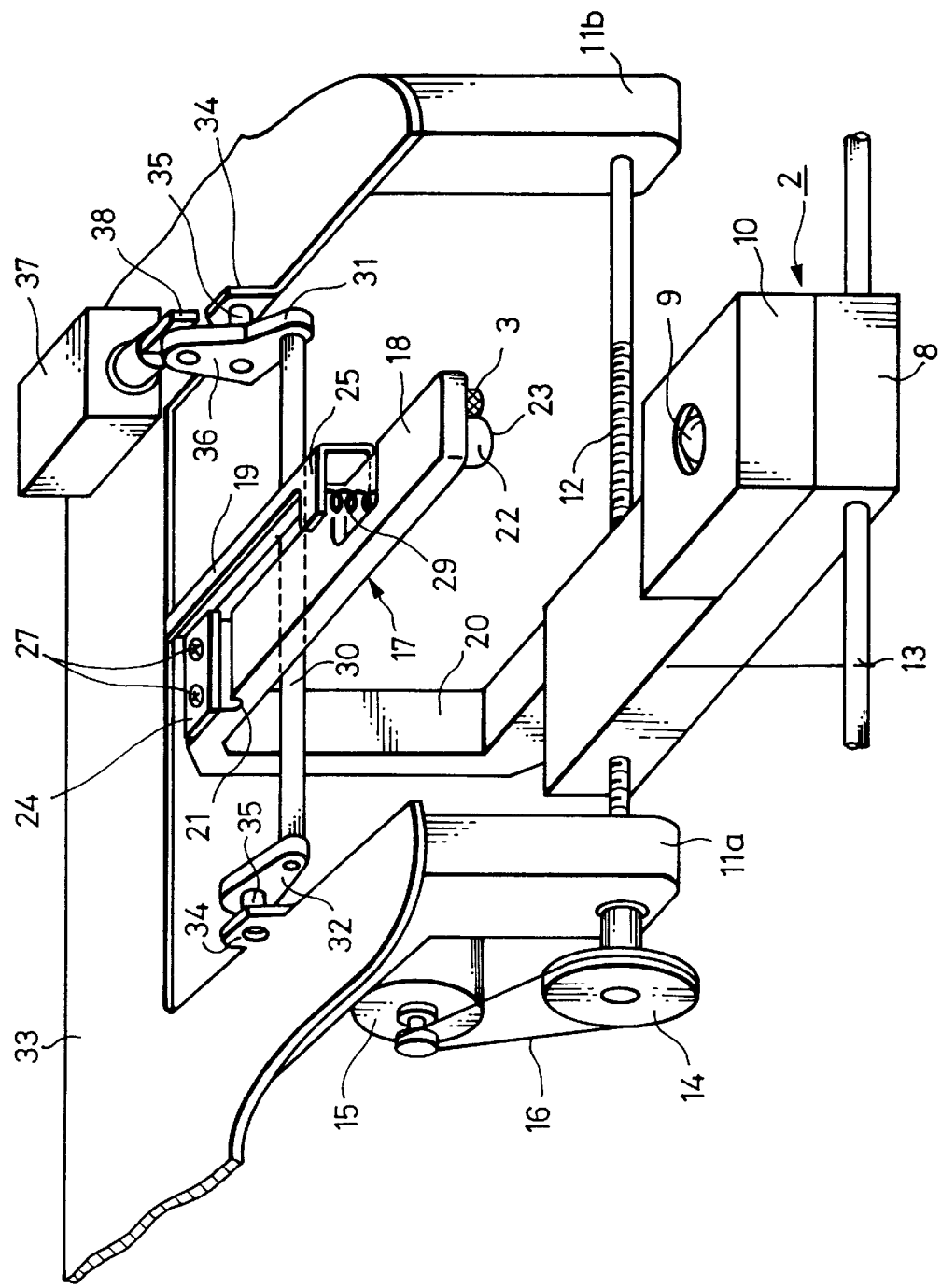
FIG. 2 is a perspective view showing a lifting mechanism for a magnetic head supporting arm according to the present invention.

FIG. 1 of the accompanying drawings shows a perspective view of a main portion that constructs a rewritable magneto-optical disc recording and/or reproducing apparatus. FIG. 2 of the accompanying drawings shows a perspective view of a lifting mechanism for a magnetic head supporting arm.

As illustrated, the MO (magneto-optical) disc recording and/or reproducing apparatus includes an optical pickup device 2 disposed on the rear surface side of a rewritable MO disc 1 and a magnetic head 3 disposed in an opposing relation to the optical pickup device 2 across the MO disc 1.

The MO disc 1 is loaded onto a turntable (not shown) in the horizontal direction and sandwiched between the turntable 4 and a clamping plate 6 attracted to the MO disc 1 by a magnet force of a magnet (not shown) that is provided on the turntable. The MO disc 1 thus held on the turntable is rotated by a spindle motor 7 that is directly coupled to the turntable.

The optical pickup device 2 comprises an optical system 8 having a semiconductor laser and a variety of lenses, an objective lens 9 for radiating a converging laser beam on the MO disc 1 and a bi-axial device 10 for moving the objective lens 9 in the tracking direction and/or focusing direction. As shown in FIG. 2, the optical pickup device 2 thus arranged is supported horizontally by means of a lead screw shaft 12 that is supported by bearing portions 11a, 11b and a guide shaft 13 which is also supported in a bearing fashion. That is, when a pulley 14 provided on one end of the lead screw shaft 12 is rotated by a drive motor 15 via a belt 16, the lead screw shaft 12 is rotated and hence the optical pickup device 2 is fed by the lead screw shaft 12 so as to become movable along the guide shaft 13 in the inner and/or outer diametrical direction of the MO disc 1.

The magnetic head 3 is disposed on an arm mechanism 17 that is moved in the inner and/or outer diametrical direction of the MO disc 1 in synchronism with the optical pickup device 2.

A magnetic head supporting arm and a lifting mechanism for this supporting arm, each of which is a main portion of the present invention, will be described in detail below with reference to FIG. 3 of the accompanying drawings.

Figure 3:
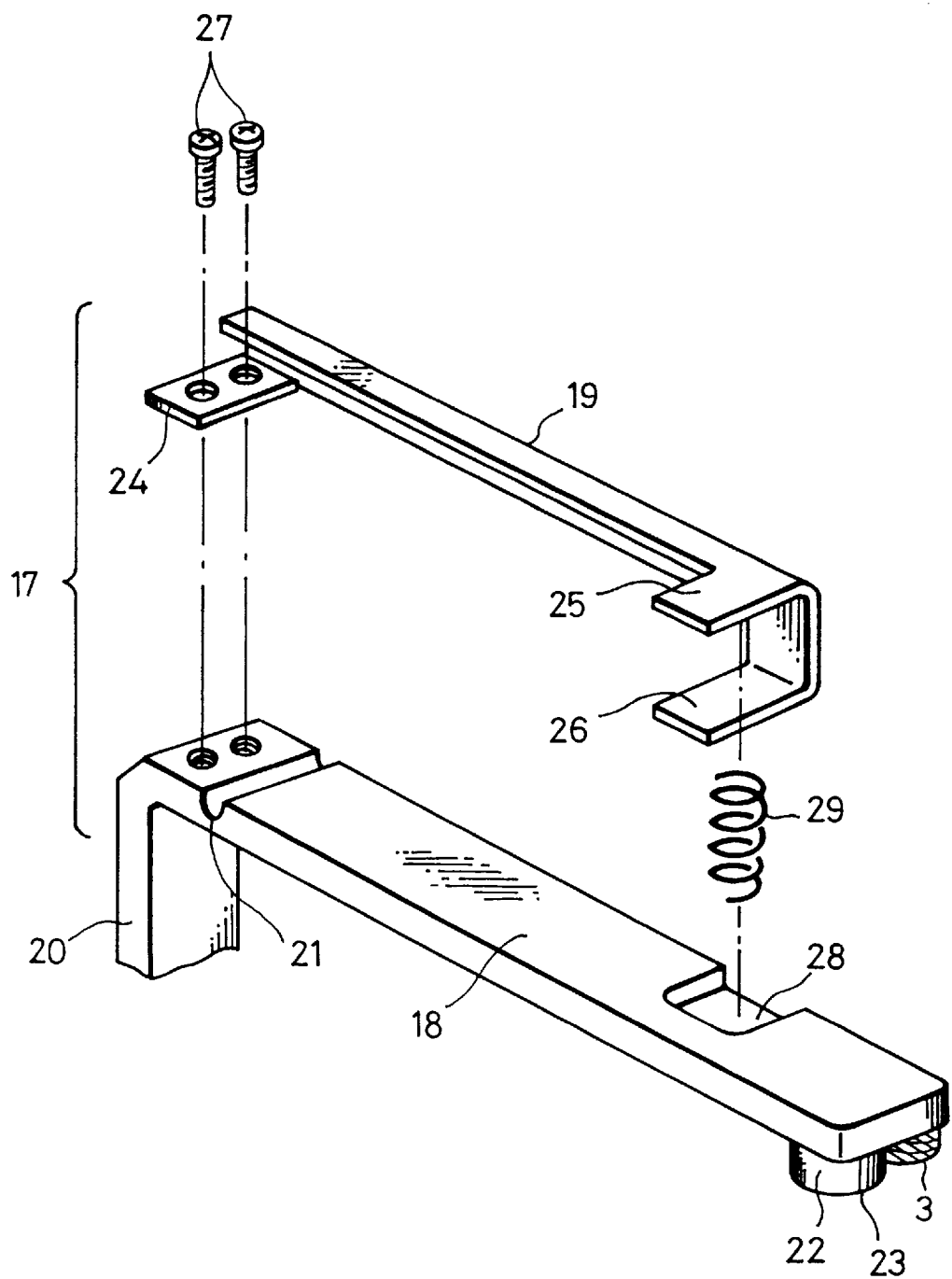
FIG. 3 is an exploded perspective view of the lifting mechanism.

As shown in FIG. 3, the arm mechanism 17 comprises an arm member 18 and an arm supporting member 19. The arm member 18 is formed of a hard plate-shaped member of plastic material such as nylon resin or the like. A rear portion of the arm member 18 is molded as one body with a coupling member 20 serving as a moving member to thereby form a U-letter shape together with the optical pickup device 2. The arm member 18 is moved in a ganged relation with the optical pickup device 2. The arm member 18 is swingably rotated in the upper and lower direction by a resilient displacing portion 21 that is formed thin in the upper and lower direction as compared with the coupling member 20. On the front end portion of the arm member 18, there is provided the magnetic head 3 in an opposing relation to the objective lens 9 of the optical pickup device 2. A sliding member 22 including a spherical contact surface 23 that comes in contact with the surface of the MO disc 1 is attached to the arm member 18 at its portion near the magnetic head 3.

The arm supporting member 19 is formed of a metal member of a channel configuration. As shown in FIG. 3, the arm supporting member 19 comprises an attaching plate 24 elongated to the rear end side thereof, a spring supporting member 25 elongated horizontally from the upper edge to the front side and an arm stopper 26 elongated horizontally from the lower edge to the same direction as the direction in which the attaching plate 24 is elongated.

The arm member 18 and the arm supporting member 19 will be described more fully. The attaching plate 24 of the arm supporting member 19 is secured to the upper surface of the coupling member 20 by screws 27 and the arm member 18 is supported on the arm stopper 26 of the arm supporting member 19. The arm member 18 is downwardly spring-biased by a coil spring 29 interposed between a concave portion 28 formed thereon and the spring support 25 of the arm supporting member 19.

The structure of the arm lifting mechanism will be described below.

As shown in FIGS. 1 and 2, a lifting member 30 of a rod configuration is disposed at the rear surface side of the arm mechanism 17. The lifting member 30 is disposed in parallel to the moving direction of the arm mechanism 17 and is sufficiently long so that it can traverse the tracks of the MO disc 1. Ends of links 31, 32 are secured to respective ends of the lifting member 30 by screws. These links 31, 32 are fixed at their other ends to hinge portions 35, 35 that are respectively supported to bearing portions 34, 34 of a chassis 33 serving as a fixed frame of the apparatus. One link 31 includes a curved lever 36 of substantially L-letter configuration and the lever 36 is coupled to a rod 38 of a plunger mechanism 37 attached on the chassis 33. Thus, the arm lifting mechanism is constructed.

According to the arm lifting mechanism, when the plunger mechanism 37 is energized to move the rod 38 in the rearward due to an exciting action, the lifting member 30 is upwardly rotated about the hinge portions 35, 35 together with the links 31, 32 through the lever 36. Therefore, the arm member 18 of the arm mechanism 17 is pushed upwardly against the spring force of the coil spring 29 interposed between the concave portion 28 and the arm supporting member 19 by the lifting member 30 so that the arm member 18 can be lifted upwardly about the resilient displacement portion 21.

After the arm member 18 was lifted upwardly, the plunger mechanism 37 is disabled and the rod 38 is moved forward by the spring action, whereby the lifting member 30 is downwardly rotated about the hinge portions 35, 35 together with the links 31, 32 in a manner opposite to the above operation. Consequently, the arm member 18 is released from being pushed upwardly by the lifting member 30 so that the arm member 18 is returned to the original position by the spring-biasing force of the coil spring 29.

During the MO disc recording and/or reproducing apparatus having the arm lifting mechanism writes and/or reads an information signal in and/or from the MO disc 1, the sliding member 22 provided on the arm member 18 is brought in contact with the surface of the MO disc 1. In that case, the arm member 18 is floated from the arm stopper 26 of the arm supporting member 19 so that the sliding member 22 is urged against the surface of the MO disc 1 only by a pressing force of the spring-biasing force of the coil spring 29.

Under the condition such that the sliding member 22 is brought in contact with the surface of the MO disc 1, the write and/or read operation is carried out by the optical pickup device 2 and the magnetic head 3 while the tracks of the MO disc 1 are being traced by the optical pickup device 2 and the magnetic head 3. Therefore, the optical pickup device 2 and the magnetic head 3 are unitarily moved from the inner diameter to the outer diameter of the MO disc 1. Then, the arm mechanism 17 that is moved in synchronism with the optical pickup device 2 is moved along the direction in which the lifting member 30 is disposed. The lifting member 30 is therefore constantly located under the arm mechanism 17 and the plunger mechanism 37 serving as the actuator of the lifting member 30 is attached on the chassis 33 such that the plunger mechanism 37 does not hinder the movement of the arm mechanism 17. Therefore, even if the optical pickup device 2 and the magnetic head 3 are located at either the outermost end or innermost end of the MO disc 1, the arm member 18 can be reliably lifted by the lifting member 30 when the MO disc 1 is loaded and/or ejected from the MO disc recording and/or reproducing apparatus.

Since the plunger mechanism 37 is disposed on the chassis 33 that serves as the fixed frame, the load on the drive motor can be reduced as compared with the conventional method in which the plunger mechanism is mounted on the moving member that moves in a ganged relation with the optical pickup device. In addition, a freedom in design that the plunger mechanism 37 is mounted on the chassis 33 can be increased considerably. Further, since the lifting member 30 is of the rotating type such that is can be rotated about the hinge portion 35, a wide space for rectilineally moving the lifting member 30 is not needed and a small space is sufficient. Therefore, the lifting mechanism can be designed compact and simplified in arrangement.

Figure 4:
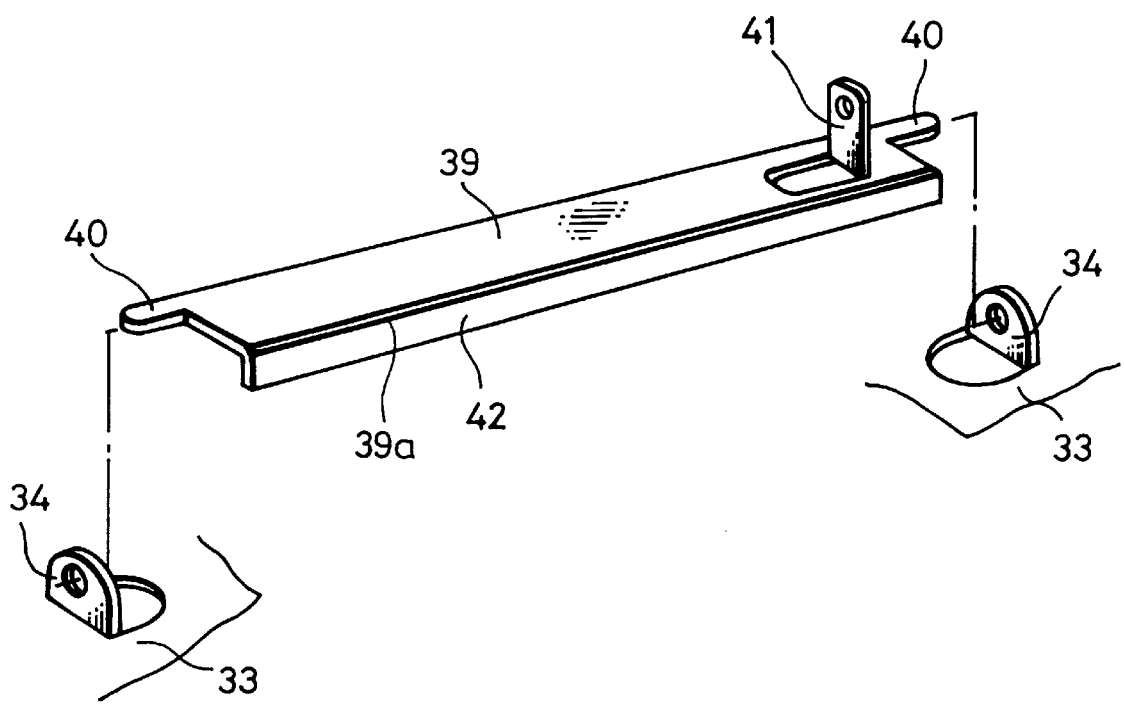
FIG. 4 is a perspective view showing a second embodiment of the lifting member according to the present invention.
Figure 5:
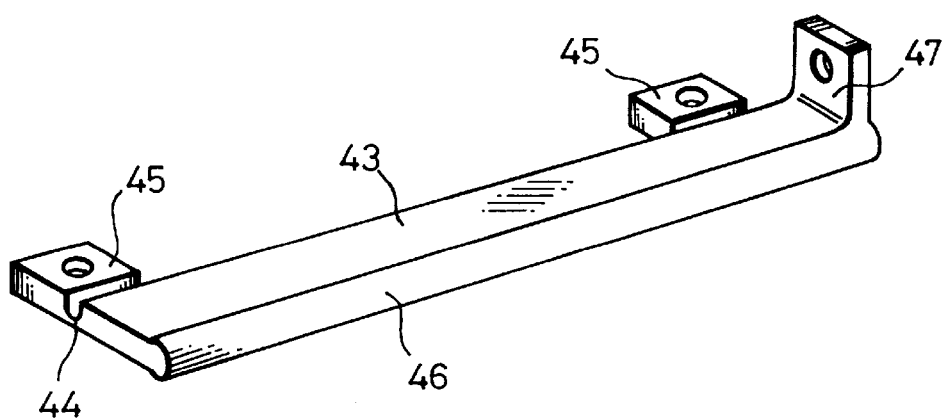
FIG. 5 is a perspective view showing a third embodiment of the lifting member according to the present invention.

FIGS. 4 and 5 of the accompanying drawings show the arm lifting mechanism according to second and third embodiments of the present invention, respectively.

In the arm lifting mechanism shown in FIG. 4, a lifting member 39 is manufactured from a metal material. Hinge shafts 40, 40 are eccentrically formed on side edges of the respective ends of the lifting member 39, and a lever plate 41 is recessed and raised vertically from the lifting member 39 near one hinge shaft 40. A flange 42 is formed on the lifting arm member 39 at its side edge opposing the hinge shafts 40, 40 through a curved surface 39a.

In the above arm lifting mechanism, the hinge shafts 40, 40 of the lifting member 39 are rotatably supported on the bearing portions 34, 34 provided on the chassis 33 that was described in the first embodiment, and the lever plate 41 is coupled to the rod of the plunger mechanism (not shown). That is, when the rod is moved forwardly or backwardly, the lifting member 39 is rotated about the hinge shafts 40, 40 through the lever plate 41 and the arm member 18 (see FIG. 2) is lifted by the curved surface 39a of the lifting member 39. Therefore, the lifting member 39 is molded by one member and can be produced inexpensively. Moreover, since the arm member 18 is lifted with a pressure by the curved surface 39a, the arm member 18 can be lifted smoothly. Further, since the flange 42 is formed on the outer edge of the curved surface 39a, the arm member 39 can be increased in rigidity.

FIG. 5 of the accompanying drawings shows the third embodiment of the arm lifting mechanism that is molded from a plastic material. As shown in FIG. 5, a lifting member 43 has formed on one side edge portion thereof, supporting portions 45, 45 coupled to the lifting member 43 through thin resilient displacement portions 44, 44 serving as hinge portions. Also, the lifting member 43 has formed on the other side edge portion thereof a spherical surface portion 46. A lever plate 47 is formed on one end portion of the lifting member 43.

In the arm lifting mechanism thus arranged, the supporting portions 45, 45 are secured to the chassis 33 shown in FIG. 4 and the lever plate 47 is coupled to the rod of the plunger mechanism, also not shown. According to the third embodiment of the arm lifting mechanism, when the rod is moved forwardly or backwardly, moving the lever plate 47, the lifting member 43 displaces the resilient displacement portions 44, 44. The arm member (not shown in FIG. 5) is lifted by the spherical portion 46 with the relative angular displacement of the lifting member 43 with respect to the supporting portions 45. Therefore, since the lifting member 43 can be molded in one molding process, the lifting mechanism can be made inexpensive. Furthermore, since the arm member is lifted by the spherical portion 46 of the lifting member 43, the arm member can be lifted smoothly.

While the arm mechanism 17 is of the type such that it is brought in contact with the MO disc as described above, the present invention is not limited thereto and may be applied to the case such that the magnetic head 3 is of the non-contact type that is servo-controlled by the actuator.

Furthermore, while the present invention is applied to the MO disc recording and/or reproducing apparatus which records and/or reproduces the MO disc under the condition that the MO disc is held in the horizontal direction as described above, the present invention is not limited thereto and may be applied to an MO disc recording and/or reproducing apparatus which records and/or reproduces the MO disc under the condition such that the MO disc is held in the vertical direction.

Having described preferred embodiments of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A magnetic head supporting mechanism for a magneto-optical disc recording and/or reproducing apparatus including an optical pickup device being made movable in the radial direction of a magneto-optical disc and radiating a light beam on tracks formed on said magneto-optical disc, and a magnetic head disposed on a head supporting mechanism movable in synchronism with said optical pickup device in an opposing relation to said optical pickup device across said magneto-optical disc so that said magnetic head generates an external magnetic field on the tracks of said magneto-optical disc, comprising:

(a) an arm member having on one end thereof provided said magnetic head and being rotatably supported to a movable member that is moved in synchronism with said optical pickup device in the direction in which said magnetic head comes in contact with or away from a surface of said magneto-optical disc, (b) a lifting member being interposed between said arm member and said magneto-optical disc substantially parallel to the moving direction of said magneto-optical disc and being supported at least on one end thereof to a chassis so that said lifting member becomes rotatable in the direction in which it comes in contact with or away from the surface of said magneto-optical disc surface; and (c) driving means for rotating said lifting member so that said arm member is lifted in the direction in which said arm member comes away from the surface of said magneto-optical disc, wherein said arm member is unitarily provided on said movable member through a hinge portion and said arm member is rotated about said hinge portion.

2. A magnetic head supporting mechanism for a magneto-optical disc recording and/or reproducing apparatus including an optical pickup device being made movable in the radial direction of a magneto-optical disc and radiating a light beam on tracks formed on said magneto-optical disc, and a magnetic head disposed on a head supporting mechanism movable in synchronism with said optical pickup device in an opposing relation to said optical pickup device across said magneto-optical disc so that said magnetic head generates an external magnetic field on the tracks of said magneto-optical disc, comprising:

(a) an arm member having on one end thereof provided said magnetic head and being rotatably supported to a movable member that is moved in synchronism with said optical pickup device in the direction in which said magnetic head comes in contact with or away from a surface of said magneto-optical disc;

(b) a lifting member being interposed between said arm member and said magneto-optical disc substantially parallel to the moving direction of said magneto-optical disc and being supported at least on one end thereof to a chassis so that said lifting member becomes rotatable in the direction in which it comes in contact with or away from the surface of said magneto-optical disc surface; and (c) driving means for rotating said lifting member so that said arm member is lifted in the direction in which said arm member comes away from the surface of said magneto-optical disc, wherein said lifting member is formed of a rod-shaped member having a length to the extent that said rod-shaped member crosses the track of said magneto-optical disc and supported at respective ends thereof to bearing portions provided on said chassis.

3. A magnetic head supporting mechanism for a magneto-optical disc recording and/or reproducing apparatus including an optical pickup device being made movable in the radial direction of a magneto-optical disc and radiating a light beam on tracks formed on said magneto-optical disc, and a magnetic head disposed on a head supporting mechanism movable in synchronism with said optical pickup device in an opposing relation to said optical pickup device across said magneto-optical disc so that said magnetic head generates an external magnetic field on the tracks of said magneto-optical disc comprising:

(a) an arm member having on one end thereof provided said magnetic head and being rotatably supported to a movable member that is moved in synchronism with said optical pickup device in the direction in which said magnetic head comes in contact with or away from a surface of said magneto-optical disc;

(b) a lifting member being interposed between said arm member and said magneto-optical disc substantially parallel to the moving direction of said magneto-optical disc and being supported at least on one end thereof to a chassis so that said lifting member becomes rotatable in the direction in which it comes in contact with or away from the surface of said magneto-optical disc surface; and (c) driving means for rotating said lifting member so that said arm member is lifted in the direction in which said arm member comes away from the surface of said magneto-optical disc, wherein said driving means comprises plunger means for pushing or retracting a rod coupled to a lever member provided on one end of said lifting member owing to an exciting action thereof and said driving means rotates said rod to bring said lifting member in contact with said arm member so that said arm member rotates in the direction in which said magnetic head comes away from said magneto-optical disc.

4. The magnetic head supporting mechanism according to claims 1 and 2, further comprising an arm supporting member being attached to said movable member for supporting said arm member so that said arm member is restricted from being rotated over a predetermined amount.

5. The magnetic head supporting mechanism according to claim 4, wherein said arm supporting member includes an attaching member for attaching said arm member to said movable member, a spring support portion for supporting a spring member that spring-biases said arm member in the direction in which said arm member comes in contact with the surface of said magneto-optical disc, and a stopper portion for restricting said arm member from being rotated in the spring-biasing direction of said spring-biasing member.

\* \* \* \* \*

UNITED STATES PATENT AND TRADEMARK OFFICE
CERTIFICATE OF CORRECTION

PATENT NO. : 6,246,639 B1
DATED : June 12, 2001
INVENTOR(S) : Hajime Yano

It is certified that error appears in the above-identified patent and that said Letters Patent is hereby corrected as shown below:

Column 1,
Line 46, change "during" to -- when --.

Column 2,
Line 23, after "parallel" insert -- manner --.

Column 4,
Line 8, after "parallel" insert -- fashion --;
Line 22, after "rearward" insert -- direction --; and
Line 41, after "During" insert -- the process when --.

Column 6,
Line 1, change "inexpensive" to -- inexpensively --.

Signed and Sealed this

Sixteenth Day of April, 2002

Attest:

*Attesting Officer*

JAMES E. ROGAN
*Director of the United States Patent and Trademark Office*